[11] 3,628,045

[72] Inventor Ronald B. Chesler
 Warren Township, Somerset County, N.J.
[21] Appl. No. 818,962
[22] Filed Apr. 24, 1969
[45] Patented Dec. 14, 1971
[73] Assignee Bell Telephone Laboratories, Incorporated
 Murray Hill, N.J.

[54] LASER HARMONIC GENERATOR
 4 Claims, 1 Drawing Fig.
[52] U.S. Cl. .................................................... 307/88.3,
 321/69, 331/94.5
[51] Int. Cl. .................................................... H02m 5/00,
 H01s 3/10
[50] Field of Search ........................................... 307/88.3;
 321/69

[56] References Cited
 UNITED STATES PATENTS
 3,487,230 12/1969 Costich ........................ 307/88.3

*Primary Examiner*—Roy Lake
*Assistant Examiner*—Darwin R. Hostetter
*Attorneys*—R. J. Guenther and Kenneth B. Hamlin ABSTRACT: In a harmonic generator of the type that includes a laser gain element and a nonlinear optical element both positioned along a main axis of the generator, the laser element may be absorptive of a substantial portion of the harmonic signal generated within the nonlinear element. To prevent such absorption the nonlinear element is positioned in an off-axis path, and the harmonic signal generated therein is directed so as not to traverse the absorptive laser element.

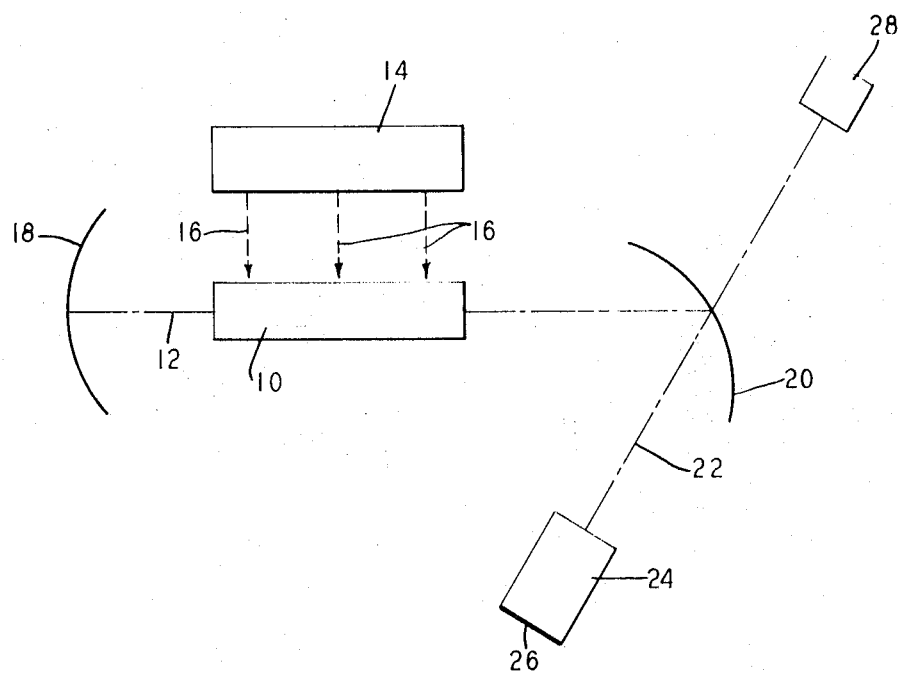

LASER HARMONIC GENERATOR

BACKGROUND OF THE INVENTION

This invention relates to signal transmission and, more particularly, to a laser harmonic generator.

It is known to double the characteristic frequency of a laser configuration by combining therewith a material that exhibits a nonlinear optical effect. One advantageous such nonlinear optical material is $Ba_2NaNb_5O_{15}$ which, when combined, for example, with a neodymium-doped yttrium aluminum garnet (Nd:YA1G) laser is effective to constitute a particularly efficient harmonic generator. In such a generator the characteristic 1.06-micron output of the Nd:YA1G configuration is converted to an output at 0.53 microns, as described in "The Nonlinear Optical Properties of $Ba_2NaNb_5O_{15}$" by J. E. Geusic, H. J. Levinstein, J. J. Rubin, S. Singh and L. G. Van Uitert, Applied Physics Letters, Nov. 1, 1967, pp. 269–271.

In some laser harmonic generators as heretofore constructed, the active laser element is found to be absorptive of second harmonic energy propagated therethrough. For example, an Nd:YA1G element is highly absorptive of 0.53-micron radiation. Hence, unless some means is devised to prevent the second harmonic of such a generator from traversing the laser element thereof, not all of the converted energy will be available for application to a utilization device.

One straightforward way of preventing the laser element from absorbing second harmonic energy is to interpose a selective deflector between the nonlinear material and the laser element. Such a deflector is adapted to direct the second harmonic output along a path that does not traverse the element. This may be accomplished, for example, by taking advantage of the known fact that the polarization of the second harmonic generated in the nonlinear material is inherently orthogonal to the polarization of the incident fundamental. A polarization-sensitive element, such as a conventional Rochon prism, is in theory effective to divert the second harmonic away from the active laser element.

However, available selective deflectors (such as Rochon prisms) have been found to be lossy and inefficient. Accordingly, as a practical matter the selective-deflector approach for preventing second harmonic energy from propagating through an absorptive laser element is not attractive.

SUMMARY OF THE INVENTION

An object of the present invention is an improved laser harmonic generator.

More specifically, an object of this invention is a generator including a harmonic-absorptive laser gain element in which the harmonic signal is prevented from propagating through the laser element.

These and other objects of the present invention are realized in a specific illustrative embodiment thereof that includes a laser gain element positioned along a main axis of the embodiment. The fundamental signal generated by the embodiment is directed by a first mirror along an off-axis path where a nonlinear optical material is positioned. The first mirror is highly reflective to the fundamental but highly transmissive to the second harmonic generated in the nonlinear material. hence, when both the fundamental and harmonic signals are reflected back from a second mirror that defines the end of the off-axis path, only the fundamental is reflected by the first mirror along the main axis to traverse the laser element. Almost all of the harmonic is passed by the first mirror to an output utilization device. In this way very little of the second harmonic signal is allowed to traverse the absorptive laser element.

Accordingly, it is a feature of the present invention that a laser harmonic generator include a main-axis mirror for reflecting the fundamental signal of the generator along an off-axis path where a harmonic-generating nonlinear optical material is positioned.

Another feature of this invention is that the off-axis path be terminated by a mirror that fully reflects the fundamental and harmonic signals and directs these signals to the main-axis mirror which is transmissive to the harmonic whereby the harmonic is diverted from propagating along the main axis.

BRIEF DESCRIPTION OF THE DRAWING

A complete understanding of the present invention and of the above and other objects, features and advantages thereof may be gained form a consideration of the following detailed description presented hereinbelow in connection with the accompanying single-figure drawing of a specific illustrative embodiment of this invention.

DETAILED DESCRIPTION

The illustrative harmonic generator shown in the drawing includes a conventional laser gain medium 10 which may, for example, comprise a neodymium-doped yttrium aluminum garnet element of the type developed by J. E. Geusic and L. G. Van Uitert (see U.S. Pat. No. 3,252,103, issued May 17, 1966). Illustratively, the element 10 is a cylindrical rod whose longitudinal axis is coincident with an axis 12 (dot-dash line) which is designated herein as constituting the main axis of the generator. Typically, the ends of the laser element 10 are flat, parallel and coated to be antireflective at a wavelength of 1.06 microns. Pumping of the element 10 to achieve an output at 1.06 microns is achieved by means of a conventional pump source 14 whose radiant output, directed at the element 10, is represented by dashed arrows 16.

The laser element 10 is contained in a cavity defined by curved members 18 and 20. The member 18 may comprise a conventional mirror which is adapted to reflect approximately 99.9 percent of the 1.06-micron radiation directed thereat. In addition, the member 18 is proportioned and arranged to propagate such radiation along the main axis 12 and to achieve focusing of the radiation within the element 10 to maximize the generation of 1.06-micron energy.

The member 20 is also highly reflective to 1.06-micron radiation that impinges thereon. However, the member 20 is tilted as shown such that incident 1.06-micron radiation from the left is directed downward along a so-called off-axis path 22. Disposed in the path 22 is an element 24 made of a nonlinear optical material, such as, for example, the aforementioned $Ba_2NaNb_5O_{15}$. Advantageously the surface of the element 24 facing the member 20 (that is, the input surface of the element 24 through which the incident fundamental propagates) is coated or otherwise treated to be antireflective to the fundamental. Otherwise, the element 24 must be aligned with great care so that any fundamental reflected from its input surface is directed back along the off-axis path 22.

In a manner well known in the art, the propagation of 1.06-micron radiation along the off-axis path 22 and into the element 24 results in the generation within the element 24 of a harmonic signal at a wavelength of 0.53 microns. In turn the harmonic and fundamental signals that propagate downward along the path 22 encounter a member 26 that is adapted to be highly reflective to both signals. Hence, these signals are directed thereby upward through the element 24 and along the path 22 to the aforementioned member 20. As indicated, the member 20 is highly reflective to the fundamental. Accordingly, the fundamental signal directed thereat along the path 22 is propagated to the left along the main axis 12. However, the member 20 is designed to be highly transmissive (99 percent) to the second harmonic signal generated within the nonlinear optical element 24. Thus, almost all of the generated harmonic signal propagated upward along the path 22 is transmitted through the member 20 to an output utilization device 28. It is apparent, therefore, that little of the harmonic signal is allowed to traverse the absorptive laser element 10.

Advantageously, the curvature of the member 20 is selected to achieve a desired spot size in the nonlinear optical element 24. In this way it is easy to maximize the interaction that gives rise to second harmonic generation in the element 24.

Thus, there has been described herein a simple, effective, isolating technique for preventing the harmonic signal generated within a nonlinear optical material from propagating through an associated laser gain element.

It is to be understood that the above-described arrangement is only illustrative of the application of the principles of the present invention. In accordance with these principles, numerous other arrangements may be devised by those skilled in the art without departing from the spirit and scope of the invention. For example, although emphasis herein has been directed to a specific laser system including Nd:YAlG and $Ba_2NaNb_5O_{15}$, it is to be understood that the principles of this invention also extend to other systems including various combinations of these and other materials. In addition, it is emphasized that the positioning and shape of the above-described members 18, 20 and 26 are illustrative only. A variety of alternative structures having the specified reflective-transmissive characteristics may be substituted for these members. Thus, for example, the member 26 could be replaced by a highly reflective curved mirror spaced apart from the element 24. Furthermore, it is apparent that the principles of this invention encompass laser harmonic generators adapted for either continuous or pulse-type operation.

What is claimed:

1. A laser harmonic generator comprising
   means including a laser gain element for generating a fundamental signal and propagating said signal along a main axis of said generator,
   means interposed in the path of said fundamental signal for directing said signal along an off-axis path,
   a nonlinear optical element positioned in said off-axis path and responsive to said fundamental signal for generating a second harmonic signal,
   and means defining the end of said off-axis path for reflecting both said fundamental and said second harmonic signals back along said off-axis path to said directing means,
   said directing means being structured to reflect said fundamental along said main axis but to transmit said second harmonic along a path that does not traverse said laser gain element,
   said means for generating a fundamental signal comprising a first mirror,
   said directing means comprising a second mirror,
   said first mirror being highly reflective to said fundamental signal and being adapted to propagate said fundamental signal along said main axis,
   said first and second mirrors being spaced apart to include said laser gain element therebetween,
   said second mirror being highly reflective to said fundamental signal and highly transmissive to said second harmonic signal and being curved to achieve a desired spot size of said fundamental signal in said nonlinear optical element.

2. A generator as in claim 1 wherein said means defining the end of said off-axis path comprises a mirror member in intimate contact with said nonlinear optical element.

3. A generator as in claim 2 wherein said laser gain element is made of neodymium-doped yttrium aluminum garnet.

4. A generator as in claim 3 wherein said nonlinear optical element is made of barium sodium niobate.

* * * * *